(12) United States Patent
Wang

(10) Patent No.: US 11,982,282 B2
(45) Date of Patent: May 14, 2024

(54) ENERGY-SAVING DEVICE FOR RAPIDLY AND INFINITELY COMPRESSING AIR

(71) Applicant: Zhenkun Wang, Marblehead, MA (US)

(72) Inventor: Zhenkun Wang, Marblehead, MA (US)

(*) Notice: Subject to any disclaimer, the term of this patent is extended or adjusted under 35 U.S.C. 154(b) by 0 days.

(21) Appl. No.: 18/097,953

(22) Filed: Jan. 17, 2023

(65) Prior Publication Data

US 2023/0400032 A1    Dec. 14, 2023

(30) Foreign Application Priority Data

Jun. 14, 2022  (CN) .................... 202221496912.9

(51) Int. Cl.
| | |
|---|---|
| F04D 25/08 | (2006.01) |
| F04D 25/02 | (2006.01) |
| F04D 25/06 | (2006.01) |
| F04D 29/32 | (2006.01) |
| F04D 29/54 | (2006.01) |

(52) U.S. Cl.
CPC ............. F04D 25/08 (2013.01); F04D 25/02 (2013.01); F04D 25/06 (2013.01); F04D 29/321 (2013.01); F04D 29/545 (2013.01)

(58) Field of Classification Search
CPC ........ F04D 19/002; F04D 19/02; F04D 25/02; F04D 25/06; F04D 25/08; F04D 29/183; F04D 29/321; F04D 29/522; F04D 29/545
See application file for complete search history.

(56) References Cited

U.S. PATENT DOCUMENTS

2016/0230768 A1 * 8/2016 Bambrogan ........... F04D 19/026

FOREIGN PATENT DOCUMENTS

| CN | 102155419 A | * | 8/2011 | |
|---|---|---|---|---|
| CN | 107906043 A | * | 4/2018 | ........... F04D 29/183 |
| CN | 112392745 A | * | 2/2021 | ............. F04D 19/02 |
| EP | 2824330 A1 | * | 1/2015 | ........... F04D 19/024 |

OTHER PUBLICATIONS

Machine translation of CN 112392745, Sun, published Feb. 23, 2021 (Year: 2021).*
Machine translation of CN 107906043, Liu, published Apr. 13, 2018 (Year: 2018).*
Machine translation of CN 102155419, Zhao, published Aug. 17, 2011 (Year: 2011).*

* cited by examiner

Primary Examiner — David E Sosnowski
Assistant Examiner — Jason G Davis
(74) Attorney, Agent, or Firm — WPAT, PC

(57) ABSTRACT

An energy-saving device for rapidly and infinitely compressing air includes housing, rotating shaft, spiral fan blade, power unit, transmission gear set, and fixing bracket, it is characterized in that the housing is connected with the fixing bracket, the rotating shaft with the spiral fan blade has upper and lower transmission gear sets, the power unit provided on the fixing bracket rotates the rotating shaft through the transmission gear set, so that a tornado-like airflow is generated in the space between the housing and rotating shaft, the devices can be stacked infinitely, so that the airflow is continuously accelerated to produce a powerful air thrust. The present invention can be widely used in aircraft and other vehicles, weapons, and protection and other aspects.

9 Claims, 5 Drawing Sheets

ENERGY-SAVING DEVICE FOR RAPIDLY AND INFINITELY COMPRESSING AIR

CROSS REFERENCE TO RELATED APPLICATION

This application claims the benefits of Chinese application Serial No. 202221496912.9, filed on Jun. 14, 2022, the disclosures of which are incorporated by references herein in its entirety.

TECHNICAL FIELD

The present invention relates to a mechanical technical field, and more particularly to an energy-saving device for rapidly and infinitely compressing air.

BACKGROUND

With the continuous development of human industrial civilization, the development of internal combustion engines has reached its limit. motorcycles, ships and small aircraft use internal combustion engines as their power source, and their speed has reached the limit. Instead, turbojet engines have been created to bring greater power to aircraft. However, there is also a disadvantage, that is, huge energy consumption. The present invention is an energy-saving device for rapidly and infinitely compressing air, which can break through the two shortcomings of insufficient internal combustion engine power and high energy consumption of turbojet engines, and infinitely compress air through the infinite superposition of this device to provide greater driving force. In addition to being widely used in motorcycles, ships, and airplanes, it can also be used in many fields such as preventing airplane crashes, train collisions, defense during weapon attacks, and dispersing clouds in extreme weather (such as tornadoes) by using its huge propulsion force quickly.

SUMMARY

Both internal combustion and jet engines need to heat the air, causing a lot of energy to be lost as heat, which cannot be converted into power. The present invention provides an energy-saving device for rapidly pressing air, achieving the function of infinitely compressing air, providing a great amount of power by infinitely stacking device units to achieve infinite compression of air.

To realize the above object, the present invention provides the following technical solutions.

Disclosed is an energy-saving device for rapidly and infinitely compressing air that includes a housing, rotating shaft, spiral fan blade, power unit, transmission gear set, and fixing bracket, characterized in that the housing is connected with the fixing bracket, the rotating shaft with the spiral fan blade has upper and lower transmission gear sets, and the power unit provided on the fixing bracket rotates the rotating shaft through the transmission gear set, so that a tornado-like airflow is generated in the space between the housing and rotating shaft, and the devices can be stacked infinitely, so that the airflow is continuously accelerated to produce a powerful air thrust.

In some embodiments, the housing is a funnel-like cone, on the middle of which has four connecting rods in connection with the fixing bracket, thereby fixing the housing.

In some embodiments, the rotating shaft is a funnel-like cone, the outer side of the upper part of the rotating shaft is connected with the housing through the transmission gear set, the spiral fan blade is tightly attached to the outer wall of the rotating shaft, the surface of the fan blade is curved and gradually decreases from top to bottom as the rotating shaft tapers, the inner chamber of the rotating shaft is hollow, and the rotating shaft is shorter than the housing.

In some embodiments, the rotating shaft has upper and lower transmission gear sets, the transmission gear set is constituted by two parts, the driving gear is a circular gear connected with the power unit thereby transmitting power, and the driven gear is a ring gear without any power source around the rotating shaft and driven to move by the driving gear thereby rotating the rotating shaft. In some embodiments, the driving gear of the upper transmission gear set is located under the driven gear thereof, and the driving gear of the lower transmission gear set is located above the driven gear, so as to fix the rotating shaft.

In some embodiments, the power unit is installed and fixed on the fixing bracket, and allows the rotating shaft to be rotated through the transmission gear set. In some embodiments, the power source of the power unit may be internal combustion engine or electric power.

In some embodiments, the fixing bracket not only can fix the housing and power unit, but can maintain the stable connection between the assembled devices.

To realize the above object, the present invention provides the following technical solutions.

In some embodiments, the principle of the device infinitely compressing air through stacking is: a tornado-like high-speed airflow B1 formed from external air A drawn in the first device that directly enters the empty chamber inside the cone of the rotating shaft of the second device. After the tornado-like high-speed airflow B2 formed by accelerating the external air A drawn in the second device is superimposed with the airflow B1 generated from the first device conveyed through the empty chamber inside the cone of the rotating shaft of the second device at the tail end of the device B, an airflow B1+B2 is formed and enters the empty chamber inside the cone of the rotating shaft of the third device, and then enters next device. In this way, by continuously stacking the device units, the airflow velocity can be superimposed and increased step by step.

During the process of compressing air, there is no need for heating, no increase of air temperature, and no heat exchange, thus saving energy.

In some embodiments, the device can be infinitely connected as needed and is a stacking device. If there is a maximum value, the compressed air volume and wind speed of each device unit are fixed values, but the device can be connected infinitely, and the air volume and wind speed are also superimposed, so it can be said to be infinite.

BRIEF DESCRIPTION OF THE DRAWINGS

FIG. 1-1 is a structural schematic view of the energy-saving device for rapidly and infinitely compressing air of the embodiment of the present invention;

FIG. 1-2 is a side view of the energy-saving device for rapidly and infinitely compressing air of the embodiment of the present invention; and FIG. 1-3 is a top view of the energy-saving device for rapidly and infinitely compressing air of the embodiment of the present invention;

FIG. 2 a collection of perspective views of the energy-saving device for rapidly and infinitely compressing air of the embodiment of the present invention, including FIGS. 2-1, 2-2, 2-3, and 2-4;

FIG. 2-1 is an overall perspective view of the energy-saving device for rapidly and infinitely compressing air of the embodiment of the present invention;

FIG. 2-2 is a side perspective view of the energy-saving device for rapidly and infinitely compressing air of the embodiment of the present invention;

FIG. 2-3 is a top perspective detailed view of the upper inset depicted in FIG. 2-2;

FIG. 2-4 is a bottom perspective detailed view of the lower inset depicted in FIG. 2-2;

FIG. 3 shows a collection of perspective views of the energy-saving device for rapidly and infinitely compressing air of the embodiment of the present invention, including FIGS. 3-1, 3-2, 3-3, 3-3-1, and 3-3-2.

FIG. 3-1 is a perspective detailed view of the upper inset depicted in FIG. 3-3 showing the working of the top end of the energy-saving device for rapidly and infinitely compressing air of the embodiment of the present invention;

FIG. 3-2 is a perspective detailed view of the lower inset depicted in FIG. 3-3 showing the working of the bottom end of the energy-saving device for rapidly and infinitely compressing air of the embodiment of the present invention;

FIG. 3-3 is a schematic view of a power unit of the energy-saving device for rapidly and infinitely compressing air of the embodiment of the present invention;

FIGS. 3-3-1 and 3-3-2 respectively are examples of power units for driving the energy-saving device in one embodiment of the present invention.

FIG. 4 is a collection of perspective views of the connection of the energy-saving device units for rapidly and infinitely compressing air of the embodiment of the present invention, including FIGS. 4-1, 4-2, and 4-3.

FIGS. 4-2 and 4-3 respectively are detailed cascading inset views of the connection of the energy-saving device units for rapidly and infinitely compressing air of the embodiment of the present invention;

FIG. 5-1 is a perspective detailed view for showing the air flowing through the energy-saving device for rapidly and infinitely compressing air of the embodiment of the present invention;

FIG. 5-2 is a perspective view of the air flowing of the energy-saving device for rapidly and infinitely compressing air of the embodiment of the present invention; and FIGS. 5-2-1, 5-2-2 and 5-2-3 respectively are a detailed view of the insets of FIG. 5-2 showing air flow within the energy-saving device for rapidly and infinitely compressing air of the embodiment of the present invention.

Figure 1:
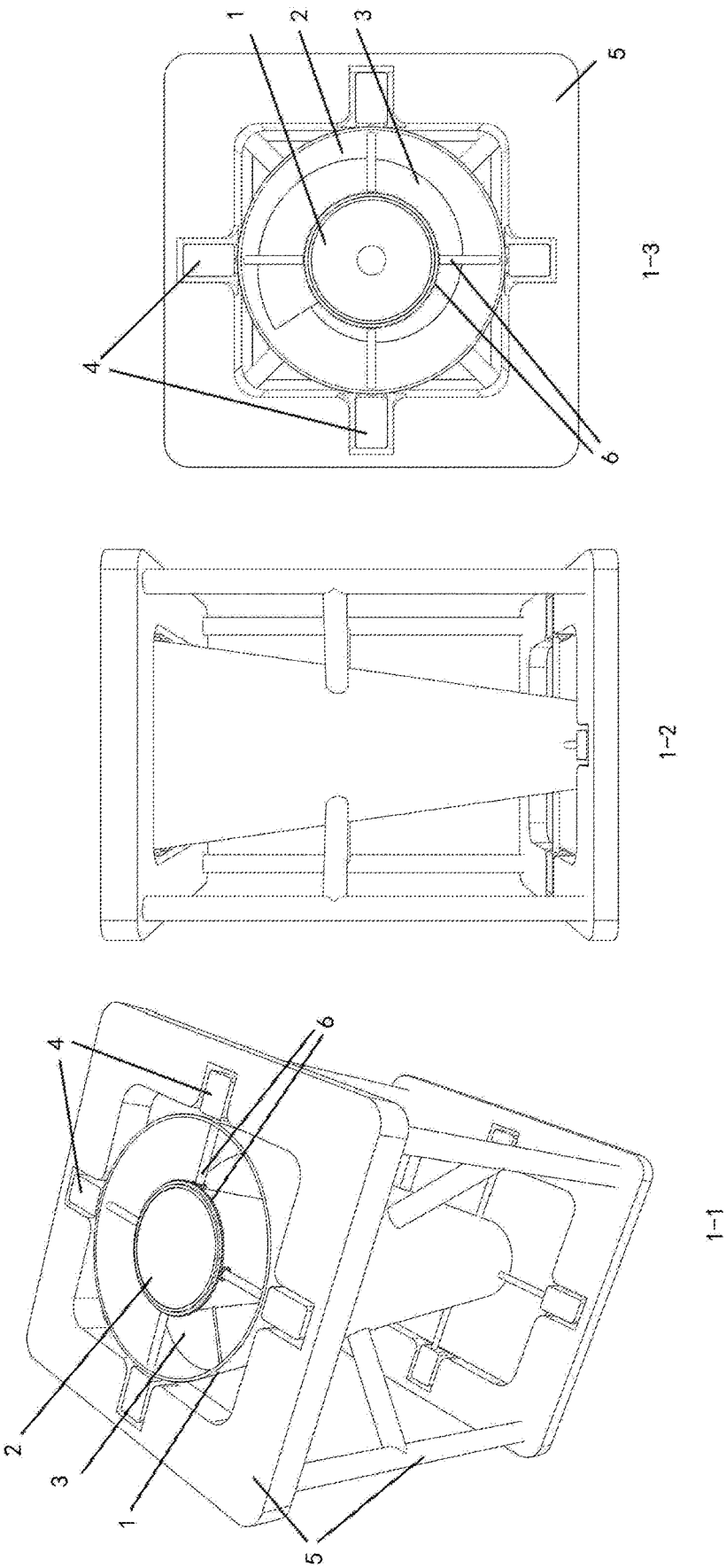
FIG. 1 is a collection of perspective views of an energy-saving device for rapidly and infinitely compressing air according to a preferred embodiment of the present invention, including FIGS. 1-1, 1-2, and 1-3.
Figure 2:
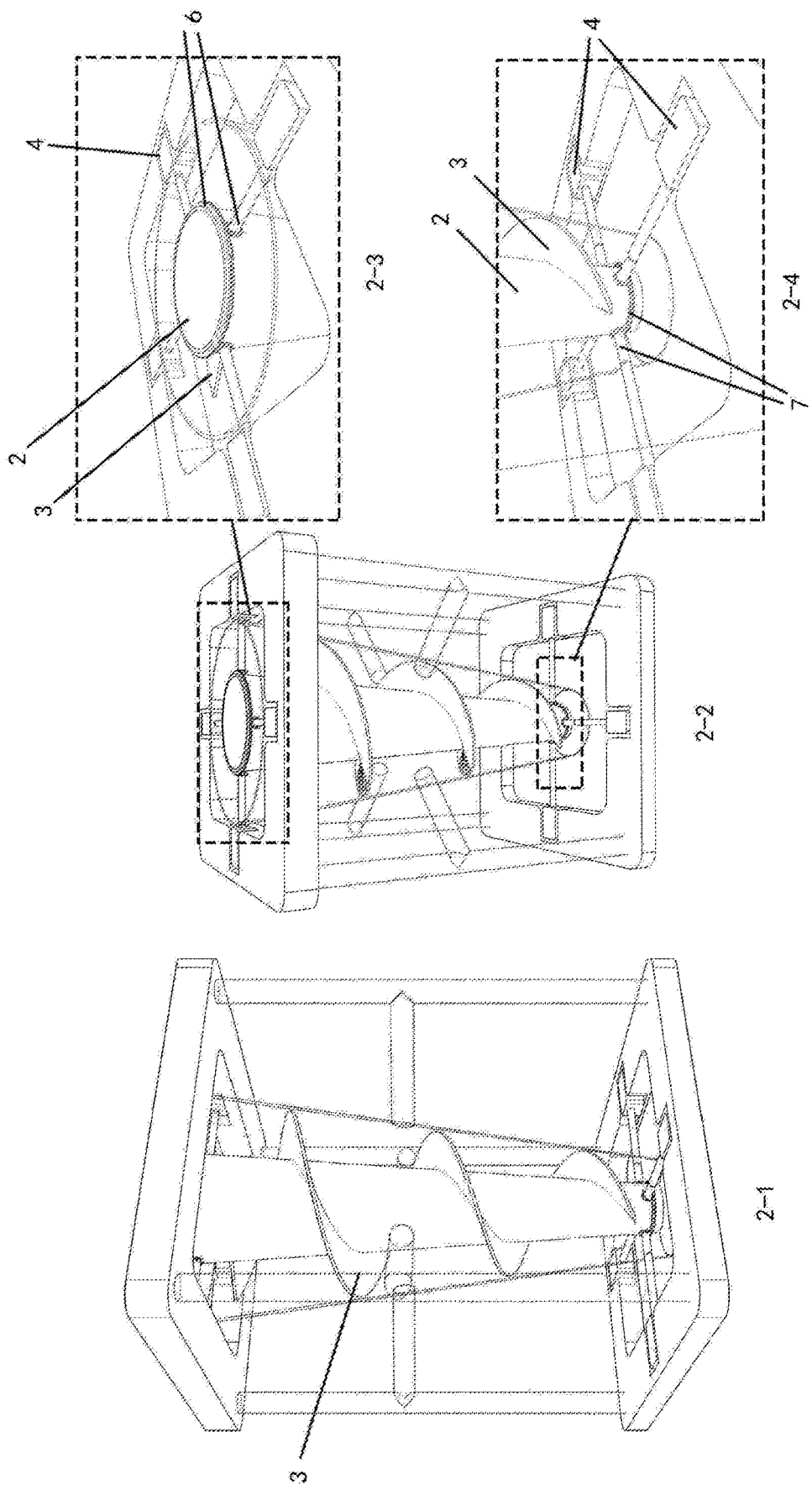
Figure 3:
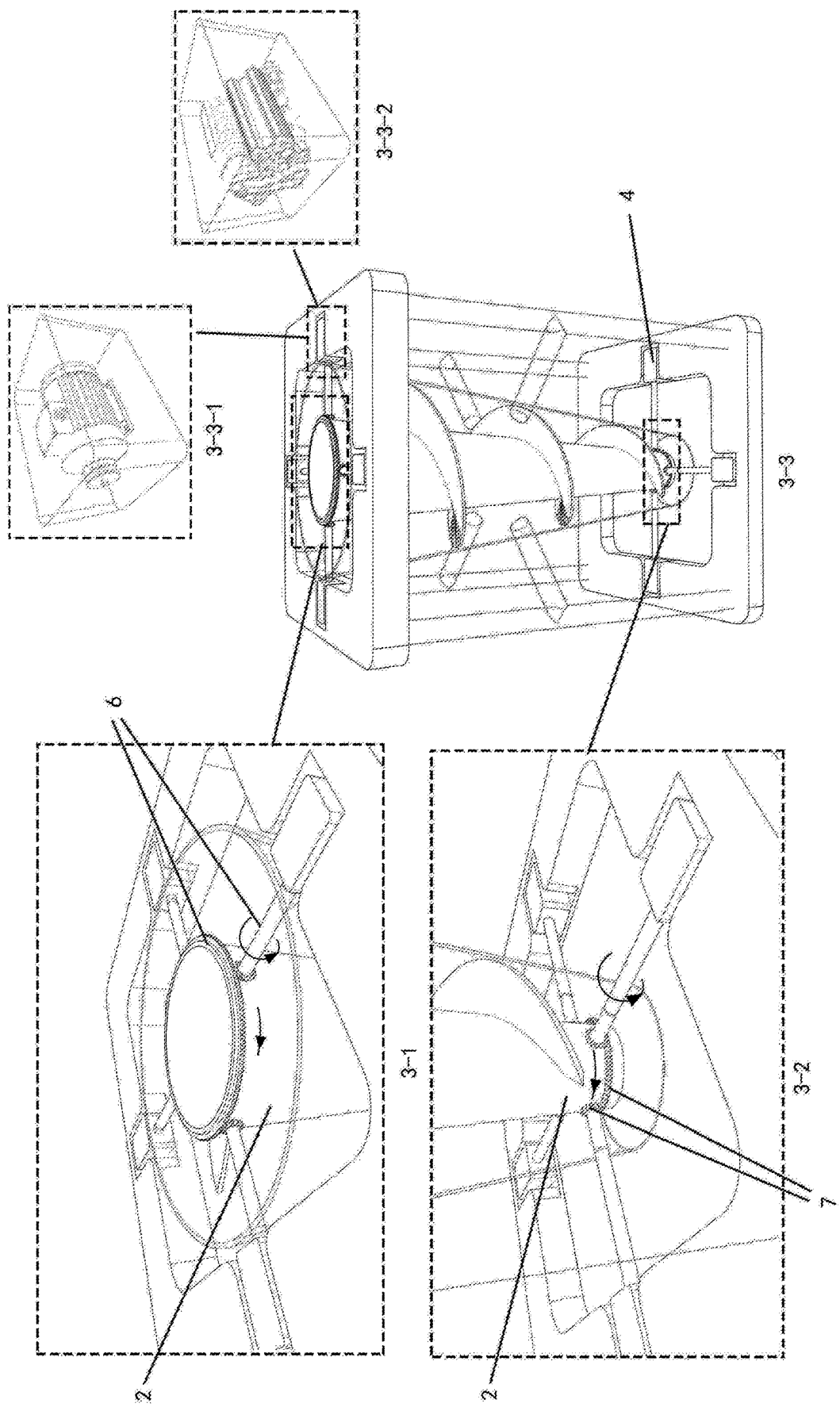
Figure 4:
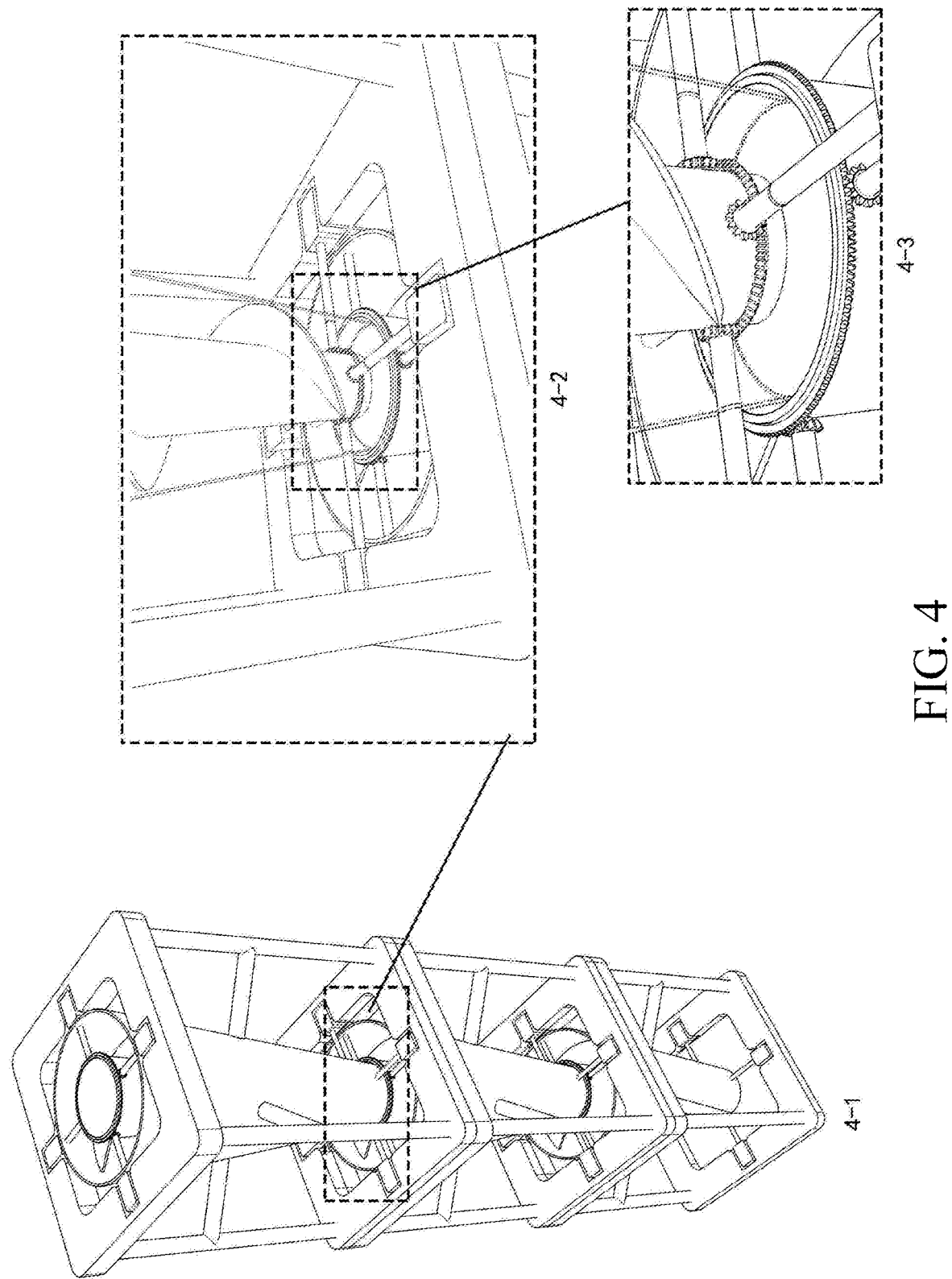

The reference numbers in the drawings are: 1: housing; 2: rotating shaft; 3: spiral fan blade; 4: power unit; 5: fixing bracket; 6: upper transmission gear set; 7: lower transmission gear set.

DETAILED DESCRIPTION

The following embodiments will further describe an energy-saving device for rapidly and infinitely compressing air according to the present invention in detail with reference to the accompanying drawings. Obviously, the described embodiments are only part of the embodiments of the present invention, not all of them. Based on the embodiments of the present invention, all other embodiments obtained by persons of ordinary skill in the art without making creative efforts belong to the protection scope of the present invention.

An energy-saving device for rapidly and infinitely compressing air, in a preferred embodiment, includes housing, rotating shaft, spiral fan blade, power unit, fixing bracket, transmission gear set, it is characterized in that the housing is connected with the fixing bracket, the rotating shaft with the spiral fan blade has upper and lower transmission gear sets, the power unit provided on the fixing bracket rotates the rotating shaft through the transmission gear sets, so that a tornado-like airflow is generated in the space between the housing and rotating shaft; the devices can be stacked infinitely, so that the airflow is continuously accelerated to produce a powerful air thrust.

Figure 5:
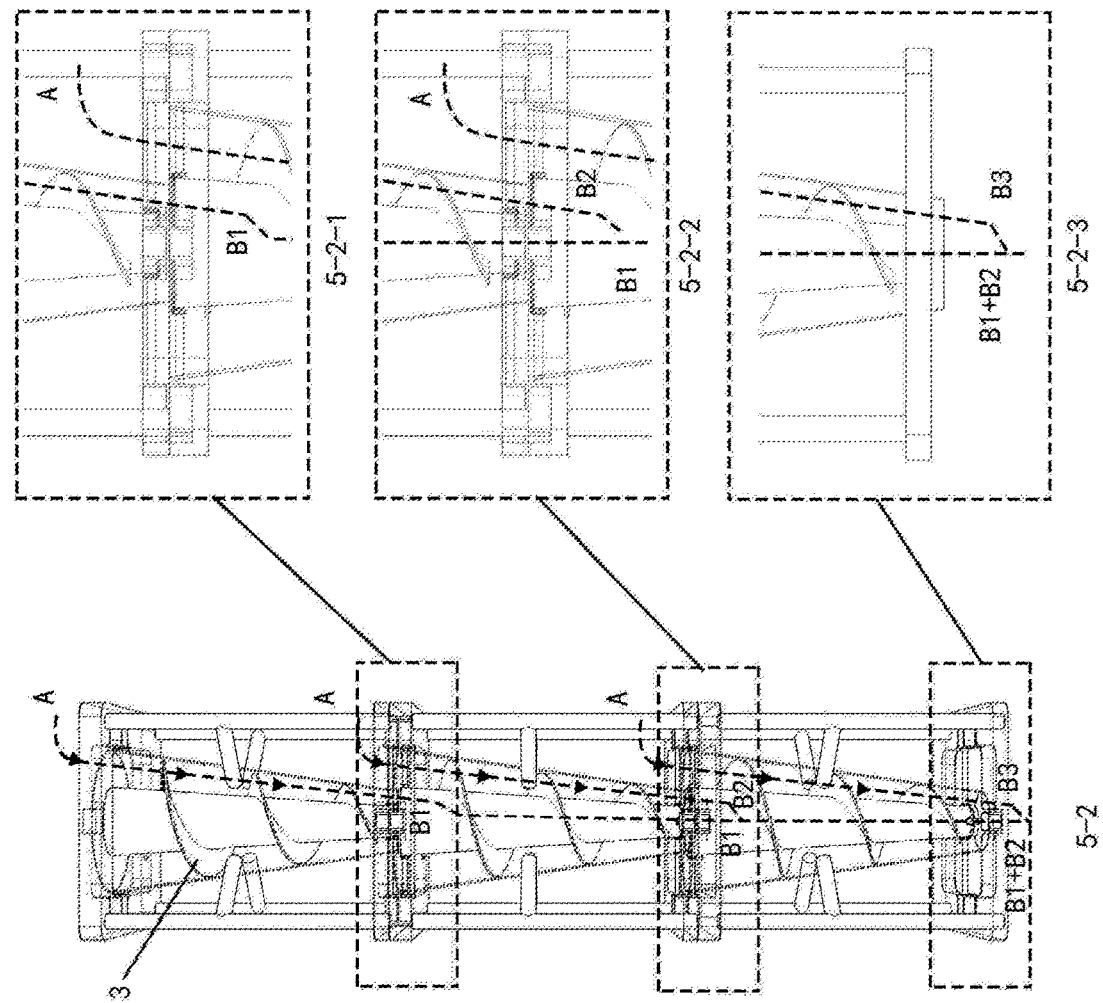
FIG. 5 is a collection of perspective views showing the air flowing of the energy-saving device for rapidly and infinitely compressing air of the embodiment of the present invention, including FIGS. 5-1, 5-2, 5-2-1, 5-2-2, and 5-2-3.

The superposition of the airflows is shown in the collection of subdrawing in FIG. 5. The tornado-like high-speed airflow B1 formed from external air A drawn in the first device directly enters the empty chamber inside the cone of the rotating shaft of the second device. After the tornado-like high-speed airflow B2 formed by accelerating the external air A drawn in the second device is superimposed with the airflow B1 generated from the first device conveyed through the empty chamber inside the cone of the rotating shaft of the second device at the tail end of the device B, an airflow B1+B2 is formed and enters the empty chamber inside the cone of the rotating shaft of the third device, and then enters next device. In this way, by continuously superimposing the device units, the airflow velocity can be superimposed and increased step by step.

Since the device can rapidly provide and continuously maintain huge thrust, it can be installed on the front end of an airplane, driven by batteries, and controlled through a computer system; it can be quickly started when the airplane loses control and crashes, and provides huge reverse thrust to reduce the acceleration caused by descent; in this process, the startup of the device and the number of unit assemblies to be turned on are all controlled by the computer system.

The device can also be installed on a locomotive, driven by engine or electricity, and controlled through a computer system. When an obstacle ahead is found and the brakes cannot stop the entire train in time, the computer system will automatically start the devices to quickly form huge reverse thrust to stop the train in time.

The device can also be installed in an important building, and controlled through the computer system. When there is an attack by missiles and other weapons, the computer automatically starts the devices to form a reverse thrust for defense.

The device can also be used to disperse the clouds of extreme weather (such as tornado) and reduce the damage and loss caused by extreme weather.

The device can also be used in fluid environment, for example, used in water, and installed on a boat to use as a boat engine. Namely, it can be installed on ships to resist attacks from torpedoes and other weapons, form reverse thrust, and change its attack direction.

The device can also be used to replace the jet engine of an aircraft and the internal combustion engine as a power source, which can reach the thrust required by the jet engine, but is more energy-efficient than the jet engine because it does not generate heat and will not cause heat loss.

The specific embodiments described herein are intended to be illustrative of the invention only. Those skilled in the art to which the present invention pertains may make various modifications or supplements to the described specific embodiments or replace them in similar ways without departing from the protection scope of the present invention.

What is claimed is:

1. An energy-saving device for rapidly compressing air, comprising:
   a housing;
   a cone-shaped rotating shaft, including a spiral fan blade;
   a first power unit; and
   a first transmission gear set;
   wherein said first power unit rotates said rotating shaft through said first transmission gear set to form cone-shaped airflow between said housing and said cone-shaped rotating shaft; and
   wherein said energy-saving device is configured to be stacked consecutively with an adjacent energy-saving device to produce a powerful air thrust.

2. The device according to claim 1, wherein said housing is cone-shaped, and in connection with a fixing bracket.

3. The device according to claim 1, wherein:
   a surface of said fan blade is curved and spirally-shaped, where an area of said surface and a diameter decrease gradually from a widest section of said rotating shaft to a thinnest section of said rotating shaft; and
   said rotating shaft is shorter than said housing.

4. The device according to claim 1, further comprising:
   a second transmission gear set;
   wherein said con-shaped rotating shaft is connected to said first transmission gear set and said second transmission gear set;
   wherein an upper driving gear of said first transmission gear set is located under a driven upper gear thereof, and
   wherein a lower driving gear of said second transmission gear set is located above a driven lower gear thereof.

5. The device according to claim 1, wherein:
   said first power unit is installed and fixed on a fixing bracket securing said first power unit, and rotates said cone-shaped rotating shaft through said first transmission gear set; and
   a power source of said first power unit is an internal combustion engine or electric power.

6. The device according to claim 1, further comprising a fixing bracket, wherein said fixing bracket affixes said housing to said first power unit, and maintains stable connection at the interface of said energy-saving device and said adjacent energy-saving device.

7. The device according to claim 1, wherein energy-saving device and said adjacent energy-saving device are configured to be consecutively stacked together such that a narrow end of said rotating shaft of said energy-saving device is position at a wider end of a rotating shaft of said adjacent energy-saving device, but not in contact therewith.

8. The device according to claim 1, wherein:
   wherein said cone-shaped airflow forms a first airflow is formed from external air drawn in said energy-saving device and said first airflow directly enters said cone-shaped rotation shaft of said adjacent energy-saving device;
   a second airflow is then formed by superimposing said first airflow with additional external air drawn in said adjacent energy-saving device conveyed through said cone-shaped rotating shaft of said adjacent energy-saving device;
   a subsequent airflow is then formed by superimposing said second airflow that enters a rotating shaft of a subsequent adjacent energy-saving device, thereby increasing the power of additional subsequent airflows in an subsequent number of additional adjacent energy-saving devices.

9. An energy-saving device for rapidly comprssing air, comprising:
   a housing;
   a hollow rotating shaft, including a spiral fan balde on an exterior surface of the hollow rotating shaft, wherein said hollow rotating shaft is positioned within said housing, a first air pathway is formed between said housing and said hollow rotating shaft, and a second air pathway is formed within said hollow rotating shaft;
   a first power unit; and
   a first transmission gear set;
   wherein said first power unit rotates said hollow rotating shaft through said first transmission gear set to form an airflow in said first air pathway; and
   wherein said energy-saving device is configured to be stacked consecutively with an adjacent energy-saving device to produce a powerful air thrust.

* * * * *